Patented May 4, 1948

2,440,671

UNITED STATES PATENT OFFICE 2,440,671

HYDROGENATION OF BUTADIENESULFONES TO THIOPHENES

James H. Boyd, Jr., Hudson Township, Summit County, Ohio, assignor to Phillips Petroleum Company, a corporation of Delaware No Drawing. Application May 1, 1944,
Serial No. 533,666

6 Claims. (Cl. 260—329)

The present invention relates to the production of thiophenes by hydrogenation of butadienesulfones, and more particularly, to the production of thiophene and alkyl-substituted thiophenes by the hydrogenation of butadienesulfone and alkyl-substituted butadienesulfones. The process of the invention provides a convenient method for the conversion of diolefins to thiophene and alkyl-substituted thiophenes.

Thiopene, $C_4H_4S$, which is also known as thiofuran, and 1-thia-2,4,-cyclopentadiene, and which has the structural formula:

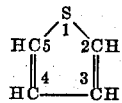

in which the carbon atoms numbered 2 and 3 are also referred to as the alpha and beta carbon atoms, respectively, is a chemical substance of increasing industrial importance. Heretofore, the principal source of the material was coal tar, with which it was associated to the extent of approximately 0.5% of the benzene fraction thereof. It is difficult to separate thiophene from said benzene fraction by distillation and unrefined coal-tar benzene as a result invariably contains thiophene as an impurity. Heretofore other methods of producing thiophene have been known. Thus, thiophene has been produced by heating sodium succinate with "phosphorus trisulfide" (Volhard and Erdmann, Berichte, 1885, vol. 18, page 454; see "Organic Syntheses," vol. XII, page 72). It has also been obtained by passing acetylene and hydrogen sulfide over catalysts such as alumina at temperatures of approximately 400° C. and by heating diethyl disulfide vapor at 496° C. (Faragher, Morrell and Comay, Ind. Eng. Chem., 1928, vol. 20, page 527). The production of thiophene by thermal catalytic decomposition of diethyl tetrasulfide or its equivalent is disclosed in a copending application, Serial No. 509,773, filed November 10, 1943, which issued January 21, 1947, as Patent No. 2,414,631, of which I am one of the joint inventors.

Homologues, that is, alkyl-substituted derivatives, of thiophene are also known. The commonest of these are the thiotolenes, of which two isomers exist, which are known also as alpha and beta-methylthiophenes or 2-methylthiophene and 3-methylthiophene or 1-thia-2-methyl-2,4-cyclopentadiene and 1-thia-3-methyl-2,4-cyclopentadiene and the thioxenes, or dimethylthiophenes, of which four isomers exist, and which are named according to the same systems of nomenclature. Other alkyl-substituted thiophenes are also known.

It is an object of the present invention to provide a process for the production of thiophene and alkyl-substituted thiophenes.

Another object of the invention is to provide a process for the production of thiophene and alkyl-substituted thiophenes by the hydrogenation of butadienesulfones (1,1-dioxothia-3-cyclopentenes).

A further object of the invention is to provide a process for the conversion of 1,3-butadiene and other similar diolefin hydrocarbons embodying conjugated double bonds to thiophene and alkyl-substituted thiophenes.

Additional objects of the invention, some of which are referred to specifically hereinafter, will be apparent to those skilled in the art to which the invention pertains.

In accordance with the process of the invention, thiophene (1-thia-2,4-cyclopentadiene) is produced by the hydrogenation of butadienesulfone (1,1-dioxothia-3-cyclopentene, also called 3,4-dehydrocyclotetramethylene sulfone). The reaction may be represented by the following equation:

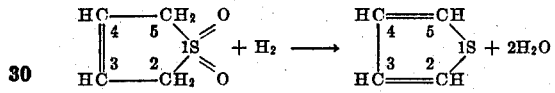

In a similar manner, hydrogenation of isoprenesulfone (1,1-dioxothia-3-methyl-3-cyclopentene) yields 3-methylthiophene (1-thia-3-methyl-2,4-cyclopentadiene):

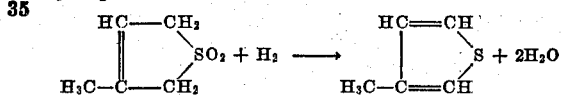

and, in general, a 1-thia-alkyl-2,4-cyclopentadiene is obtained by hydrogenation of a 1,1-dioxothia-alkyl-3-cyclopentene, in accordance with the general process of my invention, as represented in the following equation:

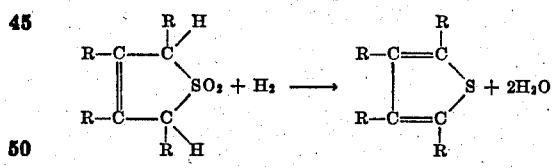

in which R is hydrogen or the same or different alkyl radicals.

1,3-butadienesulfone (1,1-dioxothia-3-cyclopentene) and alkyl-substituted butadienesulfones (alkyl-substituted, 1,1-dioxothia-3-cyclopentenes) can be readily prepared by the reaction of a 1,3-unsaturated diolefin, that is, an olefin possessing conjugated double bonds, and sulfur dioxide in accordance with the following equation:

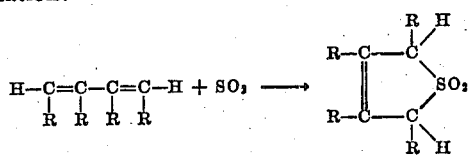

in which R represents hydrogen or the same or different alkyl radicals. 1,1-dioxothia-3-cyclopentene (butadienesulfone) has been prepared and described by Staudinger (Berichte, 1935, vol. 68B, page 455) and by Bolt and Backer (Rec. trav. chim., 1936, vol. 55, pages 898 to 903; Chem. Abs., 1937, vol. 31, page 1004). Methods for preparing butadienesulfone and other sulfones of this class have been also described by Staudinger, in German Patent No. 506,839; Craig, U. S. Patent No. 2,326,440; Perkins, U. S. Patent No. 1,993,681; Plauson, U. S. Patent No. 1,436,289; and Matthews and Strange, U. S. Patent No. 1,196,259. Isoprenesulfone (1,1-dioxothia-3-methyl-3-cyclopentene) was prepared and described in Matthews and Strange, U. S. Patent No. 1,196,259 and Eigenberger (J. prakt. chem., 1930, series 2, vol. 127, page 307). The sulfones may be prepared by reaction of a 1,3-unsaturated diolefin with liquid sulfur dioxide, water saturated with sulfur dioxide at room temperature, a solution of sulfur dioxide in ether, a saturated aqueous solution of ammonium sulfite at 120° C. or by other methods. The preparation of the sulfone constitutes only an incidental part of the present invention. Reference is directed to the book by Chester Merle Suter, "The Organic Chemistry of Sulfur" (New York, John Wiley & Sons, Inc., 1944, pages 729 et seq.) for further references to methods for preparing said compounds.

Butadienesulfone, isoprenesulfone and other sulfones of this class are readily decomposed by heat into their constituent compounds. Staudinger (Berichte, 1935, vol. 68B, page 456) states that butadienesulfone, which has a melting point of 65.5° C., decomposes quantitatively in this manner by heating at 120° to 130° C. Isoprenesulfone decomposes by heating at substantially the same temperature.

Heretofore, butadienesulfone (1,1-dioxothia-3-cyclopentene) and isoprenesulfone (1,1-dioxothia-3-methyl-3-cyclopentene) have been hydrogenated. Certain of the derivatives, such as the cis and trans dibromoisoprenesulfones, have also been hydrogenated. The products in all cases have been the corresponding saturated sulfone derivatives and not thiophene derivatives. Butadienesulfone (1,1-dioxothia-3-cyclopentene) was reported by Bolt and Backer (Rec. trav. chim., 1935, vol. 54, page 540) to be quantitatively converted by hydrogenation at room temperature in aqueous solution and in the presence of colloidal palladium to 1,1-dioxothiacyclopentane (also called cyclotetramethylene sulfone). Isoprenesulfone (1,1-dioxothia-3-methyl-3-cyclopentene) was reported to be hydrogenated catalytically to 1,1-dioxothia-3-methyl-cyclopentane (see Eigenberger, J. prakt. chem., 1931, series 2, vol. 131, page 289). Hydrogenation of such sulfones in benzene solution in the presence of a nickel and silicic acid catalyst composition has also been described (I. G. Farbenindustrie A.-G., French Patent No. 847,254; Chem. Abs. 1941, vol. 35, page 5519).

Thiophene and alkyl-substituted thiophenes, as shown in the general reaction hereinabove, are obtained in accordance with the process of my invention by hydrogenating the corresponding butadienesulfone, preferably in the substantial absence of a diluent, at a superatmospheric pressure and at an elevated temperature preferably within the range of approximately 500° to approximately 1100° F. (approximately 260° to approximately 600° C.) in the presence of a high-temperature hydrogenation catalyst that is substantially unaffected by sulfur and sulfur compounds, such as a catalyst comprising a mixture of molybdenum sulfide and tungsten sulfide. Preferred pressures are those within the range of approximately 400 to approximately 3000 pounds per square inch (approximately 25 to approximately 200 atmospheres).

Catalysts which may be used for the hydrogenation are high-temperature hydrogenation catalysts which are not substantially affected or poisoned by sulfur and thiophene derivatives. Such catalysts include the sulfides of metals of groups I-B, V-A, VI-A, and VIII of the periodic system, as well as mixtures thereof, which may be deposited on catalyst-supporting materials or used alone. Suitable catalytic materials are copper sulfide, silver sulfide, vanadium sulfide, chromium sulfide, molybdenum sulfide, tungsten sulfide, iron sulfide, cobalt sulfide, and nickel sulfide. Molybdenum and tungsten sulfides are particularly advantageous. These catalytic materials may be used in combination with other materials such as compounds of the alkaline-earth metals and alkali metals which may be used to prevent deterioration and prolong the activity of the catalytic material. Instead of starting with sulfides of the desired metals, oxides of these metals or other compounds of the metals which will be converted to sulfides as a result of side reactions may be used. Thus, for example, a vanadium oxide catalyst, which is partially or completely converted to vanadium sulfides during the hydrogenation, may be used. Likewise, a nickel or nickel oxide catalyst may be used in the reaction. These catalysts are, in general, sulfides of metals which are useful as catalysts in the methanol synthesis, that is, those which favor the reaction of carbon monoxide and hydrogen to yield methanol.

The amount of catalyst which is used may be varied widely, being dependent somewhat upon the activity of the catalyst, the conversion conditions which are to be used and the rapidity with which the desired conversion is to be effected.

Since the catalysts which are used in the process of the present invention are preferably those which are not readily poisoned by sulfur, hydrogen sulfide and thiophene, it is not essential that the hydrogen which is used be free from hydrogen sulfide and other sulfur compounds.

Temperatures which may be used for the conversion are generally within the range of approximately 500° to approximately 1100° F. and preferably that portion of the range above 900° F. Since these temperatures are above those at which the butadienesulfones decompose at atmospheric pressure into sulfur dioxide and a diolefin, the pressure maintained must be such as to prevent substantial decomposition or dissociation in this manner. The pressure and temperature are correlated. The higher the temperature of the hydrogenation, the higher should be the pressure which is applied. Generally, pressures within the range of approximately 400 to approximately 3000 pounds per square inch may be used.

The hydrogenation is preferably conducted in a batchwise manner in an autoclave. However, other methods in which the requisite pressure may be maintained may be used.

In a specific example of one method of practicing my invention, 100 grams of the crystalline butadienesulfone (melting point 64° C.) obtained from the absorption of 1,3-butadiene in liquid sulfur dioxide is charged to a steel autoclave having a capacity of approximately 1300 cc. Five grams of a catalyst consisting of a mixture of equal parts of molybdenum sulfide and tungsten sulfide is added thereto. The autoclave is then closed and is heated slowly while the autoclave is shaken and the hydrogen gas is admitted to it under pressure. The pressure is maintained at approximately 1500 pounds per square inch (100 atmospheres) while the temperature is brought to 800° F. during the course of approximately 1 hour and is held at such point for approximately 15 minutes. The autoclave is then allowed to cool and the valve on the autoclave is opened cautiously so as to bleed off excess hydrogen and any gas formed. The reaction product is then distilled for recovery of the thiophene. Normally no butadiene is obtained since any that may be formed appears as polymer. Petroleum naphtha may be used as a solvent to facilitate the removal of the thiophene from the autoclave.

Although the hydrogenation is preferably conducted in the absence of a solvent for the butadienesulfone, such as solvents may be present, if desired. Solvents appear to favor the production of saturated butadienesulfones, that is, the production of 1,1-dioxothiacyclopentanes, instead of the production of thiophenes. Substances which are hydrogen donors may be used in the reaction, and may function as solvents or replace partially or completely the hydrogen which is required in the reaction. Such hydrogen donors are isopropyl alcohol and the like.

Although the process of the invention is applicable to the hydrogenation of butadienesulfones (1,1-dioxothia-3-cyclopentenes) obtained by the reaction of sulfur dioxide with a diolefin embodying a conjugated double bond to yield 1,1-dioxothia-2,4-cyclopentadienes (thiophene derivatives), it is adaptable generally to the hydrogenation of 1,1-dioxothia-3-cyclopentene and alkyl-substituted 1,1-dioxothia-3-cyclopentenes regardless of how prepared. Normally, only diolefins having conjugated double bonds (unsaturation in the 1,3 positions) will react with sulfur dioxide or its equivalents to produce crystalline 1,1-dioxothia-3-cyclopentenes whereas other diolefins react to yield resins. However, 1,1-dioxothia-3-cyclopentenes from other sources, as well as any such compounds which cannot be prepared by the reaction of a diolefin with sulfur dioxide, may be used. The alkyl-substituent may be on the 3 or any other carbon atom of the sulfone or thiophene derivative.

Inasmuch as the foregoing description comprises preferred embodiments of my invention it is to be understood that my invention is not limited thereto. Alterations and modifications may be made therein to adapt the invention to other particular uses without departing substantially from the appended claims.

I claim:

1. A process for the production of a material selected from the group consisting of thiophene and alkyl thiophenes which comprises passing an organic compound having the same carbon skeleton as the desired product and selected from the group consisting of 1,1-dioxothia-3-cyclopentene and alkyl 1,1-dioxothia-3-cyclopentenes in admixture with a stoichiometric excess of hydrogen over a hydrogenation catalyst comprising a material selected from the group consisting of sulfides of metals of groups I-B, V-A, VI-A, and VIII of the periodic system at a temperature in the range from about 500° F. to about 1100° F., at a pressure in the range from about 25 atmospheres to about 200 atmospheres and in the absence of a solvent.

2. A process as defined in claim 1 and further characterized in that the catalyst comprises molybdenum sulfide.

3. A process as defined in claim 1 and further characterized in that the catalyst comprises cobalt sulfide.

4. A process for the production of thiophene which comprises passing 1,1-dioxothia-3-pentene in admixture with a stoichiometric excess of hydrogen over a catalyst comprising a material selected from the group consisting of sulfides of metals of groups I-B, V-A, VI-A and VIII of the periodic system at a temperature in the range from about 500° F. to 1100° F. at a pressure in the range from about 25 atmospheres to about 200 atmospheres and in the absence of a solvent.

5. A process as defined in claim 4 and further characterized in that the catalyst comprises molybdenum sulfide.

6. A process as defined in claim 4 and further characterized in that the catalyst comprises cobalt sulfide.

JAMES H. BOYD, Jr.

REFERENCES CITED

The following references are of record in the file of this patent:

UNITED STATES PATENTS

| Number | Name | Date |
| --- | --- | --- |
| 2,221,804 | Lazier et al. | Nov. 19, 1940 |
| 2,233,999 | Farlow | Mar. 4, 1941 |

OTHER REFERENCES

Backer et al. Rec. Trav. Chem., vol. 54 (1935), pages 538–544. (Copy in 260–329A.)

Van Zuydewijn: Rec. Trav. Chim., vol. 57 (1938), pp. 445–455.